United States Patent
Drescher et al.

(10) Patent No.: US 6,871,256 B2
(45) Date of Patent: Mar. 22, 2005

(54) METHOD AND ARRANGEMENT IN A STACK HAVING A MEMORY SEGMENTED INTO DATA GROUPS HAVING A PLURALITY OF ELEMENTS

(75) Inventors: Wolfram Drescher, Dresden (DE); Uwe Porst, Dresden (DE)

(73) Assignee: Systemonic AG, Dresden (DE)

( * ) Notice: Subject to any disclaimer, the term of this patent is extended or adjusted under 35 U.S.C. 154(b) by 171 days.

(21) Appl. No.: 10/137,781

(22) Filed: May 2, 2002

(65) Prior Publication Data
US 2002/0166021 A1 Nov. 7, 2002

(30) Foreign Application Priority Data
May 4, 2001 (DE) .......................... 101 21 745

(51) Int. Cl.⁷ .............................................. G06F 12/00
(52) U.S. Cl. .................... 711/101; 711/219; 711/170
(58) Field of Search ................................ 711/101, 170, 711/219, 100, 154, 118; 365/189.05, 189.01; 712/219

(56) References Cited

U.S. PATENT DOCUMENTS

| | | | |
|---|---|---|---|
| 4,459,657 A | 7/1984 | Murao | 365/200 |
| 5,640,582 A * | 6/1997 | Hays et al. | 712/38 |
| 6,167,497 A * | 12/2000 | Nakatsuka et al. | 711/202 |
| 6,560,696 B1 * | 5/2003 | Hummel et al. | 711/219 |
| 6,654,871 B1 * | 11/2003 | Aidan et al. | 712/202 |

FOREIGN PATENT DOCUMENTS

| | | | |
|---|---|---|---|
| EP | 0165822 | 12/1985 | |
| FR | 2 834 094 | * 6/2003 | G06F/12/02 |

* cited by examiner

Primary Examiner—Pierre-Michel Bataille
(74) Attorney, Agent, or Firm—Baker Botts

(57) ABSTRACT

In a data memory arrangement for a microprocessor system, in which the data memory is designed as a group memory composed of element memories in which data are storable in data groups having a plurality of elements under a group address in each instance, in order to make available a stack in which the memory space can be optimally utilized without the occurrence of memory gaps, the use is proposed of at least one memory pointer that has a group address component and an element address component. The stack memory can be operated with data words whose width is smaller than the data group width, without unutilized memory areas occurring in the stack.

21 Claims, 2 Drawing Sheets

METHOD AND ARRANGEMENT IN A STACK HAVING A MEMORY SEGMENTED INTO DATA GROUPS HAVING A PLURALITY OF ELEMENTS

BACKGROUND OF THE INVENTION

The invention relates to a method for the implementation of a stack in a data memory composed of element memories for a processor system and a data-memory arrangement.

Developments in the field of digital signal processors have led to a greatly increased interest in parallel data processing. For example, DE 198 35 216.1 discloses a processor arrangement for parallel data processing having a data memory and parallel processing units that are connected together via communication units. The data memory is designed as a group memory in which data groups having a plurality of elements in each instance are stored under an address, a processing unit being allocated to each element of the data group and the data memory in the width of one element being directly connected with memory elements of an allocated processing unit. Such an arrangement makes it possible for data elements of a data group either to be sent directly to an allocated processing unit or to be distributed to other processing units via the communication unit. Thus, a data group may be read out of the data memory and simultaneously distributed to a plurality of processing units and processed in parallel.

In such a processor arrangement, in the processing of a data processing program the necessity arises, for example, for storing local variables of procedures. Particularly in recursive procedures, holding each variable on an absolute memory address is not possible, since a second retrieval of the procedure would overwrite the first variable values deposited there. For this reason, a special memory area, which is designated as a stack and works as LIFO (last in first out) memory, is usually created for storing local variables, see for example Andrew S. Tanenbaum, James Goodman "*Computer-architektur,*" Prentice Hall, 2001, pp. 263-265. Other applications for a memory stack are well known to persons skilled in the art and therefore need not be discussed herein.

The object of the invention therefore consists in making available a stack in a data memory described above, where the available storage space may be optimally utilized, insofar as possible without the occurrence of memory gaps.

SUMMARY OF THE INVENTION

In accordance with the method of the invention, a stack area is established in the data memory and a memory pointer is used for pointing to a memory location in the stack. The memory location is established by a group address component of the memory pointer and by a parameter allocated to the memory elements, where this parameter may be an element address component of the memory pointer.

The invention is based on the idea of making available a stack in a data memory composed of element memories for data words whose width is smaller than the sum of the element memory widths, in that the memory location of a plurality of element memories is used, where a single element of an element memory may be addressed.

For optimal utilization of the memory location of the data memory, the stack is distributed to a plurality of element memories in such a way that in successive deposits on the stack first the element memories belonging to a group address are filled up one after the other and then the elements of the adjacent group addresses of all element memories are filled.

An especially advantageous embodiment of the invention consists in that when a data word is written into the stack or a data word is read out of the stack, the data word is in each instance written into a TOS (Top of Stack) register working as a stack input register and/or a stack output register. The special design of the memory pointer with a group address component and an element address component allows a data word written into the TOS register by a push instruction to be written into the area of the data memory that is indicated by the memory pointer. For the indication of a memory area in the stack after write-in or removal of a data word from the data memory, this memory pointer is incremented by the ratio of the width of the TOS register to the element width of the data memory. The stack may therefore be configured for a variety of word widths.

In a favorable development of the method according to the invention, a second memory pointer is used, which points to a memory area that lies lower by a specified value than the memory area indicated by the first memory pointer, the value being set to the ratio of the width of the TOS register to the element width of the data memory. This second pointer is advantageous when a data word is not written directly from the TOS register into the data memory, but via an intermediate register.

The function of the second pointer, because of its specified value relative to the first pointer, may alternatively be made available in that, starting from the first pointer, the specified value is deducted and the resulting address used as the address indicated by the second pointer.

It is especially advantageous when, upon increment or decrement of a memory pointer, the element address component modulo of the number of element memories is varied, a carry or borrow being transferred into the group address component. This allows the memory area, as already described above, to be filled up so that elements of a group address are described one after another, and after complete filling of the elements of a group address these are varied by one and the ratio of the TOS register width to the element memory width respectively.

Advantageously, the second memory pointer indicates the element memory and the group address that is read as next, and after the occurrence of a pop instruction both memory pointers are varied, i.e. reduced, by the ratio of the width of the TOS register to the element width of the data memory.

In order to be able to make available run time optimization and clock pulse increment for the stack segmented into a plurality of element memories, it may be provided that, after deposit of a data word into the TOS register and after readout of a data word from the data memory, the data word is temporarily stored in an intermediate register.

In order to be able to make the desired working speed of the stack according to the invention available for bidirectional transfer, it may be provided that a data word is loaded into an intermediate read register or an intermediate write register.

According to the invention there is provided a data memory arrangement, which comprises a group memory composed of element memories in which data are storable in data groups having a plurality of elements under a group address in each instance. A memory pointer, in particular in the form of a register, is provided that comprises a group address component and an element address component, the memory pointer pointing to an area of a stack located within the data memory and the stack extending over at least two element memories of the data memory.

The stack established in the data memory can be addressed without gaps by providing the memory pointer with a group address component and an element address component.

In order to compensate at least partially for the greater run times occurring in a segmented memory, it may be provided that a fixed TOS register in communication with the data memory and working as stack input and stack output register is provided, via which data words can be written into the stack and taken from the stack.

In order to keep the circuit expenditure of the data memory arrangement according to the invention small, the width of the TOS register may be adapted to the width of the element memory and to the total width of a data group. It is especially advantageous when the number of element memories is an integer multiple of the ratio of the width of the TOS register to the element memory width. In this way, it can be ensured that the total memory contents of a specified number of TOS register data words are deposited within one data group and data word splitting into another data group is unnecessary.

To increase processing speed there may additionally be provided an intermediate register means working bidirectionally, which has an intermediate read register and an intermediate write register, in each instance arranged between the element memories and the TOS register, the intermediate registers having a width corresponding to the width of the element memories.

Owing to the connection to the TOS register, data written into the intermediate write register and the intermediate read register are again available in the TOS register within a clock pulse. In addition, providing an intermediate register means for each element memory allows the data word to be read out as next from an element memory to be kept available in the intermediate register, from which it may if required be transmitted to the TOS register. Further, it is alternatively possible that all intermediate read registers keep the respective data word to be read out as next from the allocated element memory available for future retrieval.

In order for a data word written into the TOS register also to be already available in the TOS register at the next clock pulse, a multiplexer means allocated to the intermediate read register may be provided, by which a data word in the TOS register or the allocated element memory may be selected for writing into the intermediate read register.

In the following, the invention is explained by the description of an embodiment with reference to the accompanying drawing.

DESCRIPTION OF THE INVENTION

Figure 1:
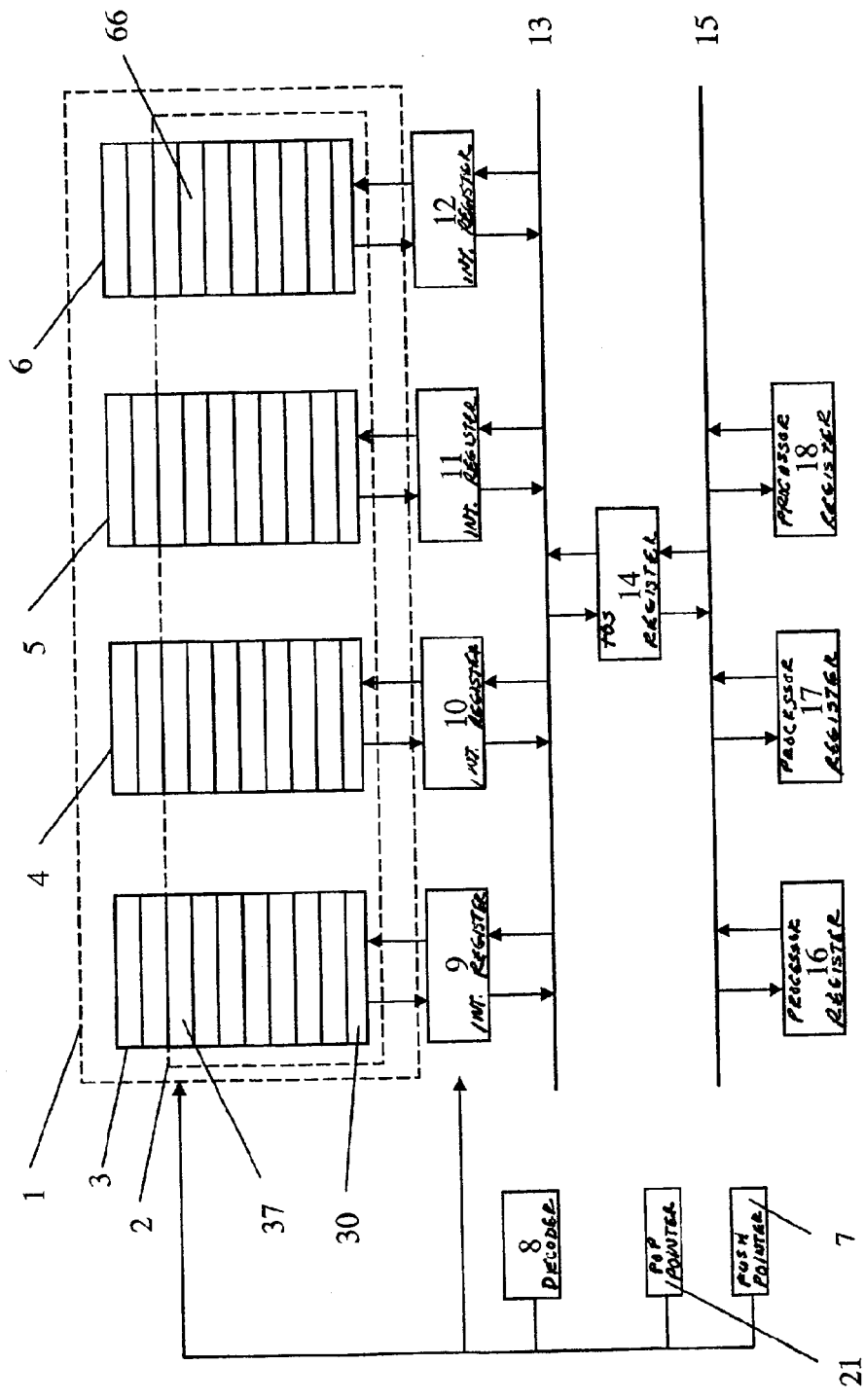
FIG. 1 shows a data memory arrangement for a memory stack.

Shown in FIG. 1 is a schematic representation of a data memory arrangement according to the invention for making available a stack 2, the data memory 1 being composed of a plurality of element memories 3, 4, 5 and 6. Data are deposited in the data memory arranged in data groups having a plurality of elements and are addressed via a so-called group address. A memory area that is designed for the implementation of a stack 2 is now established within the data memory. Specified for this purpose is the group address, which establishes the lowest group address of the stack by which the memory location is filled. Accordingly, establishment of the stack memory area consists in establishment of the start address of the stack. The memory location used by the stack is governed by the number of words written into the stack starting from the base address. A TOS register 14, which is designed as stack output and stack input register, is extracted from the stack. The TOS register is connected via a connecting network 13 with intermediate registers 9, 10, 11 and 12, each of which is allocated to one of the element memories and connected with it. The width of the intermediate register is equal to the width of the element memory. In the embodiment of the invention illustrated, the width of the TOS register 14 is also identical to the element memory width, so that a data word written into the TOS register, after intermediate deposit in an intermediate register, can be written directly into an element memory. The registers designated by the reference numerals 16, 17 and 18 are exemplary processor registers from which data can be written into the stack or can be taken from the stack via the TOS register.

Thus, an individual data word to be written into or taken from the stack consists of a specified portion of a data group, i.e., of one element. In order to be able to address such an element and its memory location in the stack 2, depending upon the embodiment, at least one memory pointer is provided which points to a memory area of the stack 2 into which a data word can be written. Two pointers 7, 21 are included in the embodiment of the invention represented in FIG. 1. The first stack pointer 7 is designated as a push pointer and the second pointer 21 as a pop pointer, the memory pointers being decoded by the decoder 8.

Figure 2:
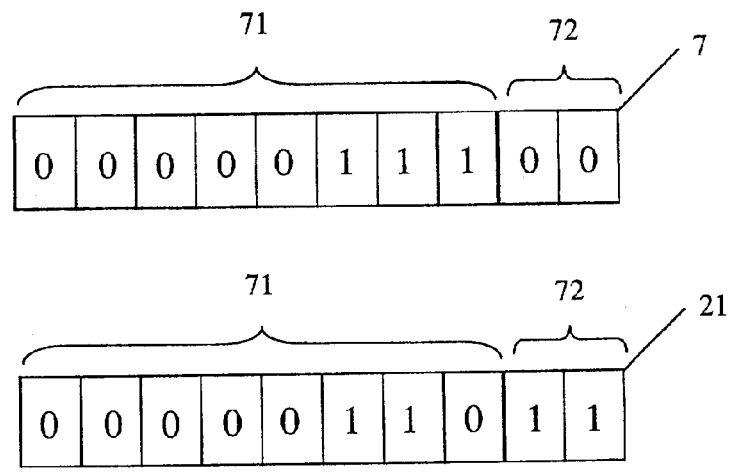
FIG. 2 illustrates the two memory pointers for the stack.

The contents of the two memory pointers is shown in FIG. 2. Each of the pointers comprises a group address component 71 and an element address component 72. The group address component has an exemplary width of 8 bits and the element address component a width of 2 bits, so that with the pointers shown in FIG. 1, four element memories can be addressed by the element address component 72 and a total of 256 data groups can be addressed by the group address component 71. Accordingly, the stack pointers are able to cover a stack having a total of 1,024 data words.

The element address component 72 of the push pointer 7 shown in FIG. 2 points to the first element memory 3 and the group address component 71 to the eighth data group, so that the push pointer 7 points to the memory element 37 in the element memory 3. The push pointer indicates the address in which the next data word written into the stack by a push instruction via the TOS register is to be deposited. In contrast, the pop pointer 21 points to the element in the stack that was last written into it and is to be taken from the data memory as the next stack element. In the present example, it points by its element address component 72 to the fourth element memory and by its group address component 71 to the seventh data group, owing to which the pop pointer 21 represented in FIG. 2 addresses the data element or data word 66, see FIG. 1. The necessity for working with two pointers results from the fact that a data word written into the TOS register is not written directly into the data memory. As a result, although the expenditure for operation of the memory increases, it is more than offset by the speed advantage gained.

The mode of operation of the stack according to the invention will now be described. Let it be assumed that a stack in the data memory represented in FIG. 1 is initialized by establishment of the first data group. Therefore, the push pointer points to the first element 30 in the element memory 3. Since no data element is yet written into the data memory, the pop pointer does not point to a valid address. Now the memory contents of the register 16 are written into the TOS register 14 by a push instruction. Still in the same clock pulse, the data word from the TOS register is written into the intermediate register 9 allocated to the first element memory 3, the TOS register 14 being connected by means of the connecting network 13 with all intermediate register means 9, 10, 11 and 12. At the same time, the intermediate register 9 is selected by the decoder 8 on the basis of the element address component of the push pointer. However, the push pointer is not yet incremented, since the data word is not yet in the allocated element memory 3. Only in the following clock pulse is the data word located in the intermediate register means 9 written into the address indicated by the push pointer, the push pointer incremented by one in the element address and the pop pointer set to the previous value of the push pointer. In this second clock pulse, an additional data word, for example from the processor register 17, can already be written into the TOS register 14, via the connecting unit 15, by means of a push instruction. Accordingly, although entry of the data word into the stack storage location allocated to it is delayed, blocking of the stack input does not occur. Additional push instructions first cause the elements of the other element memories to be filled at the specified group address and the push pointer as well as the pop pointer to be incremented by one in the element address component in each instance. Whenever a data element is written into the last element memory 6, the element address component in the push pointer is set to zero by the increment by one of the element address component, the carry to the group address component being added to it, so that the push pointer then points to the element of the element memory 3 with the group address incremented by one. The element address component modulo accordingly is varied to the number of element memories, a carry (push instruction) or borrow (pop instruction) going into the group address component.

When a data word is taken from the stack 2, the last word written in is retrieved via the TOS register and written for example into the processor register 18. After a data word has been taken from one of the element memories 3, 4, 5 or 6, the push pointer and the pop pointer are decremented by one in the element address component, while at the same time, as explained above, any borrow occurring is taken into consideration in the group address component. Owing to the special structure of the embodiment described, in which the TOS register and the element memories and intermediate register means have the same data width, counting up and counting down of the pointers is simplified. However, it is alternatively possible to use other data word widths in the TOS register, for example twice the width of the element memories. In this case, the data word written into the TOS register is partitioned into two data words and written into adjacent element memories, each of the pointers then being varied by the value two in the element address component. To prevent delays in readout of data due to intermediate switching of register means 9, 10, 11 and 12 between element memories and the TOS register 14, each of the intermediate register means has an intermediate read register and an intermediate write register.

Figure 3:
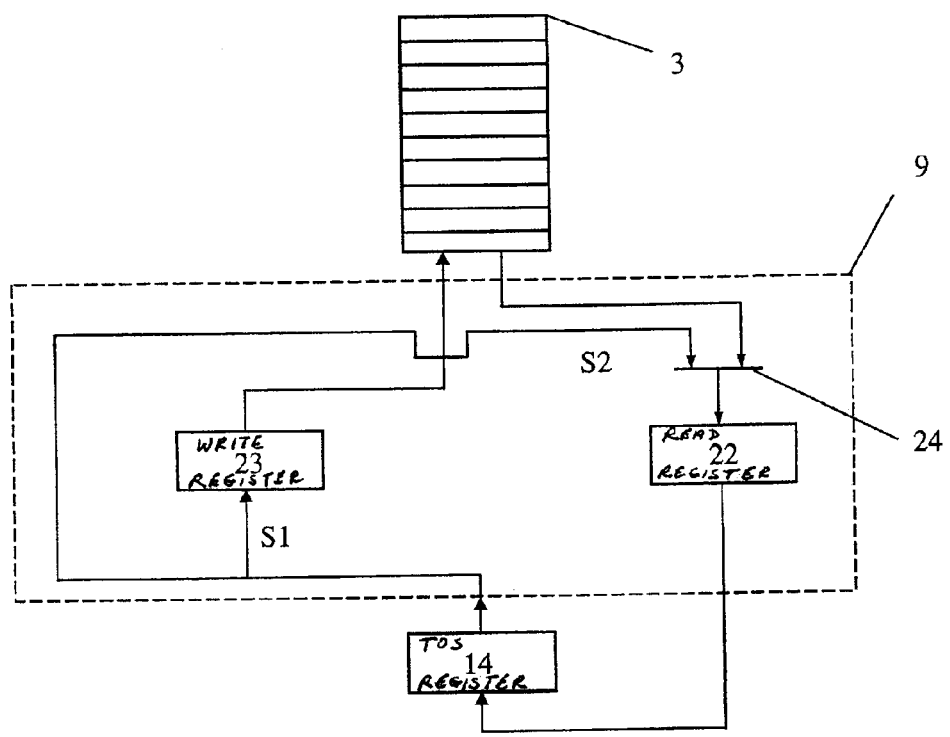
FIG. 3 shows a circuit arrangement of an intermediate register.

A detailed representation of the circuit arrangement of the element memory 3 with its allocated intermediate register means 9 is shown in FIG. 3. In the embodiment represented, all intermediate register means are structured alike, so that FIG. 3 refers only to the element memory 3 and its allocated intermediate register means 9. If a data word is written into the TOS register 14, it is transmitted via the data bus S1 to the intermediate write register 23 from which, in the next clock pulse, it can be written into the element of the element memory 3 established by the group address component. In order to be able, in a directly following pop instruction, to make the data word written into the TOS register in the previous clock pulse immediately available again in the TOS register for removal, an additional write bus S2 is provided, via which, simultaneously with writing into the intermediate write register 23, the data word can also be written into the intermediate read register 22. For this purpose, a multiplexer 24 is provided, via which it may be selected whether a data word from the element memory 3 or the data word written into the TOS register is transmitted into the intermediate read register 22.

In addition, in any given operating mode it is provided that in each instance the data word last written into the allocated element memory is preloaded into all intermediate read registers, so that upon occurrence of one or more successive pop instructions these can be transferred to the TOS register without delay.

While here have been described what are believed to be the preferred embodiments of the invention those skilled in the art will recognize that other changes and modifications may be made thereto without departing from the spirit of the invention, and it is intended to claim all such changes and modifications as fall within the true scope of the invention.

We claim:

1. A method for storing data in a data memory stack, comprising:
    arranging a data memory as a plurality of element memories having a plurality of data word locations and having an element memory width which is smaller than the sum of the element memory widths of all the element memories;
    arranging data to be stored into data groups, each data group having a plurality of data words;
    providing a memory pointer for pointing to a memory location in said data memory, said memory pointer providing a memory address comprising a group address component and an element address component corresponding to at least one of said element memories; and
    writing each data word to be stored in an element memory designated by said element address component at a location in said element memory designated by said group address component, wherein each data word to be stored is temporarily stored in a top of stack register working as a stack input register, and wherein after a data word written into the data memory the memory pointer is incremented by an amount that is a ratio of the width of the top of stack register to said sum of the element widths of the data memory.

2. A method according to claim 1, further comprising reading a data word from said data memory stack by writing the data word into said top of stack register working as a stack output register.

3. A method according to claim 2, wherein before said data word is read from the data memory into the top of stack register the data word is temporarily stored in an intermediate read register.

4. A method according to claim 3, wherein after said data word is deposited in the top of stack register by a push instruction, this data word, before being deposited in the data memory, is temporarily stored in the intermediate read register.

5. A method according to claim 3, wherein after the occurrence of a pop instruction, the data word that is stored in the data memory to which a second memory pointer points, is preloaded into an intermediate read register designated by an element address of the second memory pointer.

6. A method according to claim 1, wherein a data word written into the top of the stack register by a push instruction is written into a location in the data memory that is indicated by the memory pointer.

7. A method according to claim 1, wherein there is further provided a second memory pointer, and wherein after a data word is written into the data memory said second memory pointer is incremented by said amount that is a ratio of the width of the top of stack register to said sum of the element widths of the data memory.

8. A method according to claim 7, wherein said second memory pointer establishes a memory area in the stack that lies lower than a memory area established by said first memory pointer by a specified value, the value corresponding to said ratio of the width of the top of stack register to said sum of the element widths of the data memory.

9. A method according to claim 7, wherein said second memory pointer indicates the memory location in the stack that, upon a pop instruction, is loaded into an intermediate register indicated by the memory pointer.

10. A method according to claim 9, wherein both memory pointers, after a pop instruction, are decremented by said amount that is the ratio of the width of the top of stack register to said sum of the element widths of the data memory.

11. A method according to claim 10, wherein when a memory pointer is decremented, the element address component is decremented with a borrow being transferred from the group address component.

12. A method according to claim 1, wherein when a memory pointer is incremented, said element address component is incremented with a carry being transferred into the group address component.

13. A method according to claim 1, wherein after a data word is deposited in the top of stack register by a push instruction, this data word, before being deposited in the data memory, is temporarily stored in an intermediate write register.

14. A data memory stack for a data processor system, comprising:
   a data memory having a plurality of element memories, each element memory comprising a plurality of data word locations;
   a memory pointer for pointing to a memory location in said data memory, said memory pointer being arranged to store a group address component and an element address component; and
   a memory read/write circuit for reading data from and writing data to said data memory, said memory read/write circuit being arranged to read/write data from/to a data location corresponding to said group address component in at least one element memory selected according to said element address component, wherein said read/write circuit includes a top of stack register in communication with the data memory and working as a stack input and/or as a stack output register, via which data words can be written into the stack and/or data words can be read from the stack, and
   an intermediate register between each of the element memories and the top of stack register, for bidirectional transfer of data between said element memories and said top of stack register is provided, wherein at least one intermediate register has an intermediate read register and an intermediate write register, and wherein said intermediate register is arranged so that a data word can be written from the top of stack register into said intermediate write register from which the data word can be written to a corresponding element memory, the intermediate write register being selected by the element address component of the memory pointer.

15. A data memory stack according to claim 14, wherein the ratio of the width of the top of stack register to a sum of the element memory widths is a whole number.

16. A data memory stack according to claim 15, wherein the width of the top of stack register is equal to the width of an element memory.

17. A data memory stack according to claim 15, wherein the number of element memories is an integer multiple of the ratio of the width of the top of stack register to the element memory widths.

18. A data memory stack according to claim 14, wherein said intermediate registers have the width of said element memories.

19. A data memory stack according to claim 14, wherein said intermediate register is arranged so that a data word can be written from the top of stack register into said intermediate read register, the intermediate read register being selected by the element address component of the memory pointer.

20. A data memory stack according to claim 19, wherein there are provided first and second memory pointers and wherein said intermediate register is arranged so that a data word can be written from an element memory into an intermediate read register, the intermediate read register being selected by the element address component of a second memory pointer.

21. A data memory stack according to claim 20, wherein said intermediate register includes a multiplexer allocated to the intermediate read register, by which a data word is selectable from the top of stack register or the allocated element memory.

* * * * *